(12) United States Patent
Zhang et al.

(10) Patent No.: US 11,158,094 B2
(45) Date of Patent: Oct. 26, 2021

(54) STANDARDIZED UPTAKE VALUE (SUV) GUIDED RECONSTRUCTION CONTROL FOR IMPROVED OUTCOME ROBUSTNESS IN POSITRON EMISSION TOMOGRAPHY (PET) IMAGING

(71) Applicant: KONINKLIJKE PHILIPS N.V., Eindhoven (NL)

(72) Inventors: Bin Zhang, Cleveland, OH (US); Chuanyong Bai, Solon, OH (US); Shushen Lin, Cleveland, OH (US); Andriy Andreyev, Willoughby Hills, OH (US); Zhiqiang Hu, Twinsburg, OH (US)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 84 days.

(21) Appl. No.: 16/474,576

(22) PCT Filed: Jan. 3, 2018

(86) PCT No.: PCT/EP2018/050111
§ 371 (c)(1),
(2) Date: Jun. 28, 2019

(87) PCT Pub. No.: WO2018/127507
PCT Pub. Date: Jul. 12, 2018

(65) Prior Publication Data
US 2019/0325619 A1 Oct. 24, 2019

Related U.S. Application Data

(60) Provisional application No. 62/443,134, filed on Jan. 6, 2017, provisional application No. 62/492,508, filed on May 1, 2017.

(51) Int. Cl.
*G06K 9/00* (2006.01)
*G06T 11/00* (2006.01)
(Continued)

(52) U.S. Cl.
CPC ............. *G06T 11/006* (2013.01); *G06T 5/20* (2013.01); *G06T 11/008* (2013.01); *G06T 5/002* (2013.01);
(Continued)

(58) Field of Classification Search
CPC ................ G06T 11/006; G06T 11/008; G06T 2207/20192; G06T 2211/424; G06T 5/002;
(Continued)

(56) References Cited

U.S. PATENT DOCUMENTS 7,953,265 B2  5/2011 Sirohey
8,660,636 B2  2/2014 Gagnon
(Continued)

FOREIGN PATENT DOCUMENTS

CN   104605875 A   5/2015

OTHER PUBLICATIONS

Ronald Boellaard, 2008, Eur J Nucl Med Mol Imaging, ) 35:2320-2333.*
(Continued)

*Primary Examiner* — Xin Jia (57) ABSTRACT

A nuclear medicine image reconstruction method generates a reconstructed image (44) by performing iterative image in reconstruction (30, 130) on nuclear medicine imaging data (22). The iterative image reconstruction produces a sequence of update images (34, 36, 134, 136). During the iterative image reconstruction, a standardized uptake value (SUV) transform (40) is applied to convert an update image (34, 36) to an update SUV image (42, 46). The SUV
(Continued)

transform scales values of voxels of the update image to SUV values using scaling factors including at least a body size metric and a dose metric. During the iterative image reconstruction, at least one parameter used in an image update of the iterative image reconstruction is adjusted using the update SUV image. For example, a parameter of a prior or filter (38) incorporated into an image reconstruction update step (32) or used in filtering of an update image (36) may be adjusted.

18 Claims, 4 Drawing Sheets (51) Int. Cl.
 *G06T 5/20* (2006.01)
 *G06T 5/00* (2006.01)
(52) U.S. Cl.
 CPC ............ *G06T 2207/10104* (2013.01); *G06T 2207/10108* (2013.01); *G06T 2207/20192* (2013.01); *G06T 2210/41* (2013.01); *G06T 2211/424* (2013.01)
(58) Field of Classification Search
 CPC ............ G06T 5/20; G06T 2207/10104; G06T 2207/10108; G06T 2210/41
 See application file for complete search history.

(56) References Cited

U.S. PATENT DOCUMENTS

| | | |
|---|---|---|
| 9,179,885 B2 | 11/2015 | Georgi |
| 2009/0212225 A1 | 8/2009 | Zheng |
| 2014/0270443 A1 | 9/2014 | Vija |
| 2015/0003708 A1 | 1/2015 | Prevrhal |
| 2017/0053423 A1* | 2/2017 | Ahn ..................... A61B 6/037 |
| 2017/0108596 A1* | 4/2017 | Ma ........................ G01T 1/2985 |

OTHER PUBLICATIONS

Elisabetta Grecchi et al "Influence of Three Reconstruction Algorithms on the Estimation of the Standardize uptake Value in 18F-fluoride PET", 2013 IEEE Nuclear Science Symposium and Medical Imaging Conf. Oct. 2013, pp. 1-5.

Boellaard, Ronald et al "The Netherlands Protocol for Standardisation and Quantification of FDG Whole Body ET Studies in Multi-Centre Trials", European Journal of Nuclear Medicine and Molecular Imaging, vol. 35, No. 12, Aug. 2008, pp. 2320-2333.

Internatinal Search Report and Written Opinion for PCT/EP2018/050111, dated Apr. 25, 2018.

\* cited by examiner

STANDARDIZED UPTAKE VALUE (SUV) GUIDED RECONSTRUCTION CONTROL FOR IMPROVED OUTCOME ROBUSTNESS IN POSITRON EMISSION TOMOGRAPHY (PET) IMAGING

CROSS-REFERENCE TO PRIOR APPLICATIONS

This application is the U.S. National Phase application under 35 U.S.C. § 371 of International Application No. PCT/EP2018/050111, filed on Jan. 3, 2018, which claims the benefit of U.S. Provisional Patent Application No. 62/443,134, filed on Jan. 6, 2017 and U.S. Provisional Patent Application No. 62/492,508, filed on May 1, 2017. These applications are hereby incorporated by reference herein.

FIELD

The following relates generally to the medical imaging arts, positron emission tomography (PET) imaging and image reconstruction arts, single photon emission computed tomography (SPECT) imaging and image reconstruction arts, and related arts.

BACKGROUND

In positron emission tomography (PET) imaging, a radiopharmaceutical is administered to a patient, e.g. by intravascular infusion. The radiopharmaceutical may, for example, be a glucose-containing pharmaceutical agent such as fluorodeoxyglucose (FDG) in which the glucose molecules are tagged with a radioisotope such as fluorine-18 ($^{18}F$). The $^{18}F$-tagged glucose preferentially concentrates in high-metabolism tissue, so that the resulting PET image is a functional image representing a metabolic distribution. The approach is useful, for example, in oncology imaging as cancerous tumors or tissue tend to have high metabolism, and for various types of brain imaging.

In the case of a positron-emitting radiopharmaceutical, each emitted positron undergoes electron-positron annihilation resulting in emission of two oppositely directed 511 keV gamma rays. In PET imaging, one or more rings of PET detectors detect the oppositely directed 511 keV gamma rays using coincidence detection. Each such pair of oppositely directed 511 keV gamma rays defines a line of response (LOR). In time-of-flight (TOF) PET, the positron-electron annihilation event is further localized along the LOR based on the small but finite time difference (or lack thereof) between the two 511 keV detection events. The collected PET data are reconstructed, e.g. using an iterative reconstruction algorithm such as maximum likelihood expectation maximization (MLEM) or ordered subset expectation maximization (OSEM) to generate a PET image in which voxel values represent the radioactivity (i.e. LOR counts) of the corresponding spatial locations.

For clinical interpretation, the PET image has certain deficiencies. The counts represented by each voxel value are dependent on the patient physiology but also on numerous other factors, such as radiopharmaceutical dosage, patient weight, time interval between administration of the radiopharmaceutical and subsequent PET imaging data collection, scan acquisition time, and so forth. Thus, while the relative voxel values may be clinically useful, the absolute voxel values of the PET image are not clinically useful.

It is known to improve upon this situation by transforming the PET image using a Standardized Uptake Value (SUV) function. Various SUV function formulations are employed by different PET imaging system vendors. A typical formulation can be written as:

$$SUV(i, D, M) = \frac{v_i}{D/M}$$

where i is the index of a voxel of the PET image, $v_i$ is the value of the voxel i (that is, the activity concentration in the tissue at voxel i), D is the radiopharmaceutical dose, and M is the body mass of the patient. The injection of radioactivity is usually followed by a waiting time for dose uptake prior to acquisition of the PET imaging data, and this may also be taken into account in the SUV. Using the SUV transform, the PET image is converted to the standardized uptake values, i.e. SUV, and the resulting SUV image is reviewed by the oncologist, doctor, or other medical professional to make clinical determinations. Advantageously, the voxel values of the SUV image are independent of factors such as radiopharmaceutical dose and patient body mass, thus enabling the medical professional to meaningfully interpret the absolute voxel values of the SUV image.

The following discloses a new and improved systems and methods.

SUMMARY

In one disclosed aspect, a nuclear medicine image reconstruction device comprises an electronic processor and a non-transitory storage medium storing instructions readable and executable by the electronic processor to perform an image reconstruction method including generating a reconstructed image by performing iterative image reconstruction on nuclear medicine imaging data. The iterative image reconstruction produces a sequence of update images. During the iterative image reconstruction, a standardized uptake value (SUV) transform is applied to convert an update image to an update SUV image, and at least one parameter of the iterative image reconstruction is adjusted using the update SUV image.

In another disclosed aspect, a non-transitory storage medium stores instructions readable and executable by an electronic processor to perform an image reconstruction method comprising generating a reconstructed image by performing iterative image reconstruction on nuclear medicine imaging data wherein the iterative image reconstruction produces a sequence of update images. During the iterative image reconstruction, a standardized uptake value (SUV) transform is applied to convert an update image to an update SUV image. The SUV transform operates to scale values of voxels of the update image to SUV values using scaling factors including at least a body size metric and a dose metric. During the iterative image reconstruction, at least one parameter used in an image update of the iterative image reconstruction is adjusted using the update SUV image.

In another disclosed aspect, an image reconstruction method is disclosed. A reconstructed image is generated by performing iterative image reconstruction on nuclear medicine imaging data. The iterative image reconstruction produces a sequence of update images. The reconstructed image is converted to a standardized uptake value (SUV) image using an SUV transform that scales values of voxels of the reconstructed image using scaling factors including at least a body size metric and a dose metric. A clinical image is generated by filtering the SUV image using a filter with at least one parameter that is locally adjusted on the basis of local voxel values of the SUV image. The image reconstruction method may be performed by an electronic processor.

One advantage resides in providing nuclear medicine image reconstruction with improved robustness against noise.

Another advantage resides in providing iterative reconstruction of nuclear medicine images employing filtering or regularization with improved specificity to suppressing noise while preserving image features.

Another advantage resides in providing nuclear medicine images with improved image quality.

Another advantage resides in providing nuclear medicine images with reduced dependence on factors such as radiopharmaceutical dose, patient weight, and radiopharmaceutical dose decay.

A given embodiment may provide none, one, two, more, or all of the foregoing advantages, and/or may provide other advantages as will become apparent to one of ordinary skill in the art upon reading and understanding the present disclosure.

BRIEF DESCRIPTION OF THE DRAWINGS

The invention may take form in various components and arrangements of components, and in various steps and arrangements of steps. The drawings are only for purposes of illustrating the preferred embodiments and are not to be construed as limiting the invention.

DETAILED DESCRIPTION

Nuclear medicine image reconstruction may employ an edge preserving regularization, edge-preserving filtering, or other processing designed to preferentially suppress noise while retaining features in the image. Such regularization or filtering typically employs control parameters that are tuned to optimally suppress noise while retaining features. For example, the Relative Difference Prior (RDP) is a known edge preserving prior in which an edge preservation threshold, conventionally denoted as $\gamma$, controls the strength of edge preservation. In the RDP prior, a larger threshold $\gamma$ produces greater edge preservation; while, at the opposite limit a value of $\gamma=0$ eliminates edge preservation entirely, reducing the RDP to a quadratic prior. Optimal image quality is obtained for an optimal value of the edge preservation threshold $\gamma$. Selection of this optimal threshold $\gamma$ is difficult, however, because the optimal value depends on factors such as the radiopharmaceutical dose, patient weight, and dose decay time, all of which impact the counts measured for a given anatomical region. Said another way, the counts for a given image feature depend on factors such as dose, patient weight, and dose decay.

Thus, image counts can be significantly different from one imaging session to another depending upon the patient, the dose, and the study-to-study, patient-to-patient, dose-to-dose and duration-to-duration. Consequently, a count level corresponding to noise in one image may correspond to a count level of an image feature in another image. This complicates selection of the RDP threshold $\gamma$ or other optimization parameter(s) of a prior or image filter used during the image reconstruction.

It is recognized herein that the SUV conversion function is already available in most PET imaging devices, and can be advantageously repurposed to provide a consistent and stable level of image values for setting the edge preservation threshold $\gamma$ or other regularization or filtering parameters, so as to normalize out the variant factors such as patient weight, scan duration, injection dose and so forth. By leveraging the SUV in controlling the adaptive parameter(s), the image reconstruction can be made more robust as compared with the usual approach of controlling the adaptive parameter(s) on image counts. The SUV is advantageously constructed based on first principles to ensure stability for major organs such as liver, lung, body background. By way of illustration, a 1000 count level can be a hot liver for a low-dose study, or can be a cold lung in a high-dose study. But in both cases, after applying the SUV transform the liver counts are generally in a small range e.g. around 2.5 SUV. Using SUV thus provides a convenient and stable mechanism to distinguish image features versus noise for a wide range of different imaging tasks. SUV is not a simple constant scaling of image counts, but instead is a non-linear conversion from count level based on varying clinical specifications such as body size, radiopharmaceutical dose, and dose decay time.

Figure 1:
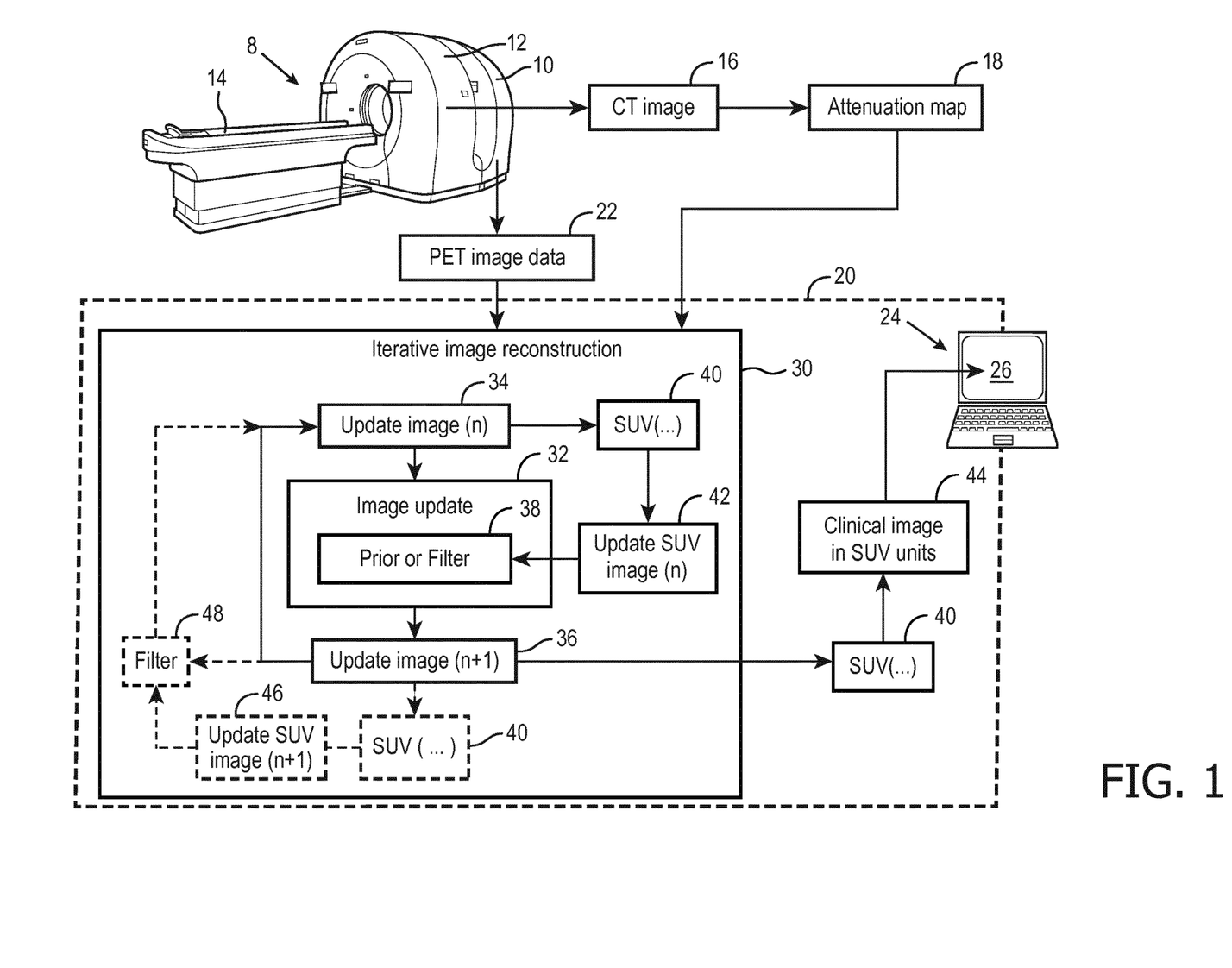
FIG. 1 diagrammatically illustrates a positron emission tomography (PET) imaging system.

With reference to FIG. 1, an illustrative imaging system is a combined positron emission tomography (PET)/transmission computed tomography (CT) imaging device 8, which includes both a PET imaging gantry or scanner 10 and a CT gantry or scanner 12 mounted with coaxial bores such that a patient may be loaded onto a common patient table 14 and loaded into either the CT gantry 12 for CT imaging or the PET gantry 10 for PET imaging. By way of non-limiting illustrative example, the illustrative PET/CT imaging device imaging scanner 6 may be the PET gantry of a Vereos™ Digital PET/CT scanner, available from Koninklijke Philips N. V., Eindhoven, the Netherlands. An advantage of employing the combined PET/CT imaging device 8 for the PET imaging study is that the CT scanner 12 can be used to acquire a CT image 16 that is converted to an attenuation map 18 by appropriate conversion of the Hounsfield numbers of the CT image to corresponding absorption values at 511 keV (the energy of gamma rays emitted during positron-electron annihilation events). While a combined PET/CT imaging system has the foregoing advantage, it is also contemplated to employ a standalone PET gantry or scanner for performing the PET imaging data acquisition. Moreover, in other contemplated embodiments the nuclear medicine imaging is single photon emission computed tomography (SPECT) imaging performed using a gamma camera.

As diagrammatically shown in FIG. 1, an electronic processor 20 processes PET imaging data 22 acquired by the PET imaging gantry or scanner 10 to generate a reconstructed PET image while employing SUV to control the reconstruction processing (e.g. for setting edge preservation thresholds or the like) as disclosed herein. The electronic processor 20 may, for example, be embodied as a computer 24 (e.g. a desktop computer, network-based server computer, a dedicated PET control computer, various combinations thereof, or so forth) that executes instructions read from one or more non-transitory storage media (e.g. one or more hard drives, optical disks, solid state drives or other electronic digital storage devices, various combinations thereof, or so forth) that stores the instructions. The computer 24 typically includes or has operative access to at least one display 26 (e.g. an LCD display, plasma display, or so forth) for displaying reconstructed PET (and optionally CT) images.

The electronic processor 20 generates a reconstructed image by performing iterative image reconstruction 30 on the nuclear medicine imaging data 22. The iterative image reconstruction 30 performs image updates 32 each operating on a most recent update image 34, indexed (n) in the illustrative example, to produce a next update image 36, indexed (n+1) in the illustrative example, thereby iteratively producing a sequence of update images. The process is started with a suitable initial image (corresponding to n=0), such as a uniform image or a more complex initial image incorporating some prior knowledge, if available. The iterative image updates 32 may employ substantially any suitable image update, and may employ regularization and/or filtering to suppress noise or for other purposes. By way of non-limiting illustration, in one embodiment the image update 32 employs a maximum likelihood expectation maximization (MLEM) update with regularization 38 employing a relative difference prior (RDP), which may in this illustrative example be expressed as:

$$\lambda_j^{(n+1)} = \lambda_j^{(n)} + \underbrace{\frac{\lambda_j^{(n)}}{s_j} \frac{\partial}{\partial \lambda_j} \left[ \sum_{i=1}^N y_i \log\left(\sum_{j=1}^P a_{ij}\lambda_j^{(n)} + r_i\right) - \left(\sum_{j=1}^P a_{ij}\lambda_j^{(n)} + r_i\right) \right]}_{MLEM} - \qquad (1)$$

$$\underbrace{\frac{\lambda_j^{(n)}}{s_j} \frac{\partial}{\partial \lambda_j} \left[ \sum_{k \in N_j} \beta_{kj}^* \frac{(\lambda_j^{(n)} - \lambda_k^{(n)})^2}{\lambda_j^{(n)} + \lambda_k^{(n)} + \gamma|\lambda_j^{(n)} - \lambda_k^{(n)}|} \right]}_{RDP}$$

where $y_i$, i=1, ..., N is the measured imaging data (i.e. the measured LOR counts forming the PET imaging data 22), $\lambda_j$ is the estimated activity at voxel index j, $$\beta_{kj}^* = \frac{w_k \beta_j}{\sum_{\forall k} w_k}$$

is a local penalty weighting factor, $a_{i,j}$ is the system matrix value, i.e., the contribution of voxel j to projection data index i, $s_j$ the total scanner sensitivity at voxel j scaled with the acquisition time, and parameter γ>0 for steering the Gibbs prior (i.e. the edge preservation threshold). In general, a larger γ produces greater edge preservation. The value γ=0 eliminates edge preservation entirely, and the RDP becomes a quadratic prior. The term $N_j$ denotes the set of voxels neighboring the voxel indexed by j. This is merely an illustrative example, and in other embodiments another image update may be employed, such as ordered subset expectation maximization (OSEM) or so forth. The RDP can be replaced by another prior, or by an image filter. As is known in the art, the iterative reconstruction can also optionally be corrected for attenuation of 511 keV gamma rays using the attenuation map (18) generated from the CT image (16), or generated from a magnetic resonance (MR) image or the like.

With continuing reference to FIG. 1, during the iterative image reconstruction 30, a standardized uptake value (SUV) transform 40 is applied to convert an update image 34 to an update SUV image 42. The SUV transform 40 operates to scale values of voxels of the update image 34 to SUV values using scaling factors including at least a body size metric and a dose metric. For example, the following non-limiting illustrative SUV formulation may be employed:

$$SUV(i, D, M, t) = \frac{v_i}{\frac{D}{M} \cdot \left(\frac{1}{2}\right)^{\frac{t}{t_{1/2}}}} \qquad (2)$$

where i is the index of a voxel of the PET image, $v_i$ is the value of the voxel i (that is, the activity concentration in the tissue at voxel i) in the update image 34 being transformed, D is the radiopharmaceutical dose, M is the body mass of the patient, t is a delay time between administration of the radiopharmaceutical and the PET imaging data acquisition, and $t_{1/2}$ is the half-life of the radiopharmaceutical. The activity concentration $v_i$ is calibrated so that $v_i$ is in units of radioactivity per unit volume, e.g. MBq/ml or mCi/ml. The injected activity D divided by body mass M (that is, the ratio D/M) yields a unit of MBq/g or equivalent if body weight in grams is used as measurement M of body size. Then this will leave SUV to be in unit of g/ml or equivalent. As soft tissue is approximately considered to be at 1 g/ml, SUV value is typically presented as a unitless parameter. Furthermore, the injection of radioactivity is usually followed by the indicated waiting time t for dose uptake prior to acquisition of the PET imaging data. This leads to a dose decay over the time interval t between the time of the injected dose measurement and the time of the activity concentration measurement in the image the scan time). The term $$\left(\frac{1}{2}\right)^{\frac{t}{t_{1/2}}}$$

is thus a dose decay scaling factor that accounts for the dose decay over the time interval t. The SUV formulation of Equation (2) is merely an example, and other formulations are known. For example, while in Equation (2) the body size is captured by the body mass M, in some other formulations the body size is capture by a body surface area term.

During the iterative image reconstruction 30, at least one parameter used in the image update 32 of the iterative image reconstruction 30 is adjusted using the update SUV image 42. In the illustrative example of FIG. 1 and Equation (1), the edge preservation threshold γ is adjusted based on the update SUV image 42. In one approach, the edge preservation threshold γ is adjusted based on a characteristic of the SUV image 42, such as the average SUV value over the image, a difference between the maximum and minimum SUV values, or so forth. The dependence of the edge preservation threshold γ on the SUV image characteristic can be determined empirically, e.g. based on a training set of images in which each image is reconstructed using the image update of Equation (1) with several different γ values, and subsequent evaluation of the optimal reconstructed image by skilled medical professionals. The SUV image characteristic for each training image is determined for a given update image, and the correlation between SUV image characteristic and optimal edge preservation threshold γ is thus determined.

In another embodiment, the SUV image 42 is used to choose the edge preservation threshold γ locally, so that γ generally varies spatially across the image depending upon the local SUV value. A suitable formulation of the update step of Equation (1) in this case is:

$$\lambda_j^{(n+1)} = \lambda_j^{(n)} + \underbrace{\frac{\lambda_j^{(n)}}{s_j} \frac{\partial}{\partial \lambda_j} \left[ \sum_{i=1}^{N} y_i \log\left(\sum_{j=1}^{P} a_{ij}\lambda_j^{(n)} + r_i\right) - \left(\sum_{j=1}^{P} a_{ij}\lambda_j^{(n)} + r_i\right) \right]}_{MLEM} -$$

$$\underbrace{\frac{\lambda_j^{(n)}}{s_j} \frac{\partial}{\partial \lambda_j} \left[ \sum_{k \in N_j} \beta_{kj}^* \frac{(\lambda_j^{(n)} - \lambda_k^{(n)})^2}{\lambda_j^{(n)} + \lambda_k^{(n)} + \gamma_i(SUV(\lambda_j^{(n)}))|\lambda_j^{(n)} - \lambda_k^{(n)}|} \right]}_{RDP} \quad (3)$$

where $\gamma_j(SUV(\lambda_j^{(m)}))$ is the local edge preservation threshold determined on the basis of the local SUV value $SUV(\lambda_j^{(n)})$ with $SUV(\ldots)$ denoting the SUV function 40 indicated in FIG. 1. Thus, for example, where $SUV(\lambda_j^{(m)})$ has a value indicative of a feature the edge preservation threshold is suitably set higher to enhance preservation of the feature, whereas where $SUV(\lambda_j^{(m)})$ has a value indicative of noise the edge preservation is suitably set lower, or even to zero, so as to reduce or eliminate the edge preservation and thereby maximize the noise suppression.

With continuing reference to FIG. 1, the iterative image reconstruction 30 iterates to produce the sequence of update images until a stopping criterion is met, e.g. the iteration-over-iteration change in the update images, that is, the change from update image (n) to update image (n+1), becomes smaller than some stopping threshold. The last update image of the sequence is then the reconstructed image in units of counts. This image is then transformed to SUV units by applying the SUV function 40 to produce the final clinical image 44 in SUV units. The clinical image 44 may be displayed on the display 26 in operative communication with the electronic processor 20, and/or may be printed on a printer, stored in a radiology information system (RIS) or picture archiving and communication system (PACS), or otherwise utilized.

In the just-described approach, the SUV image 42 is used to adjust one or more parameters of a prior or filter used in the image update 32 of the iterative reconstruction process. For example, the edge preservation threshold γ of the RDP prior incorporated into the MLEM update of Equation (1) is adjusted based on the update SUV image 42 either globally or locally (as expressed in Equation (3)).

With continuing reference to FIG. 1, in an alternative embodiment (shown using dotted lines) the SUV function 40 may be applied to adjust filtering performed on the update image (n+1) 36 after the completing the image update 32 of the MLEM or other iterative image reconstruction. That is, in this approach the SUV function 40 is applied to the update image (n+1) 36 to generate an update SUV image (n+1) 46 which is analogous to the update SUV image 42, and the update SUV image (n+1) 46 is then used to adjust one or more parameters of a filtering operation 48 that is performed on the update image (n+1) 36 before proceeding to the next iteration of the MLEM or other iterative image reconstruction process. This approach has certain potential advantages such as using the latest update image (n+1) 36 for generating the SUV image 46.

Figure 4:
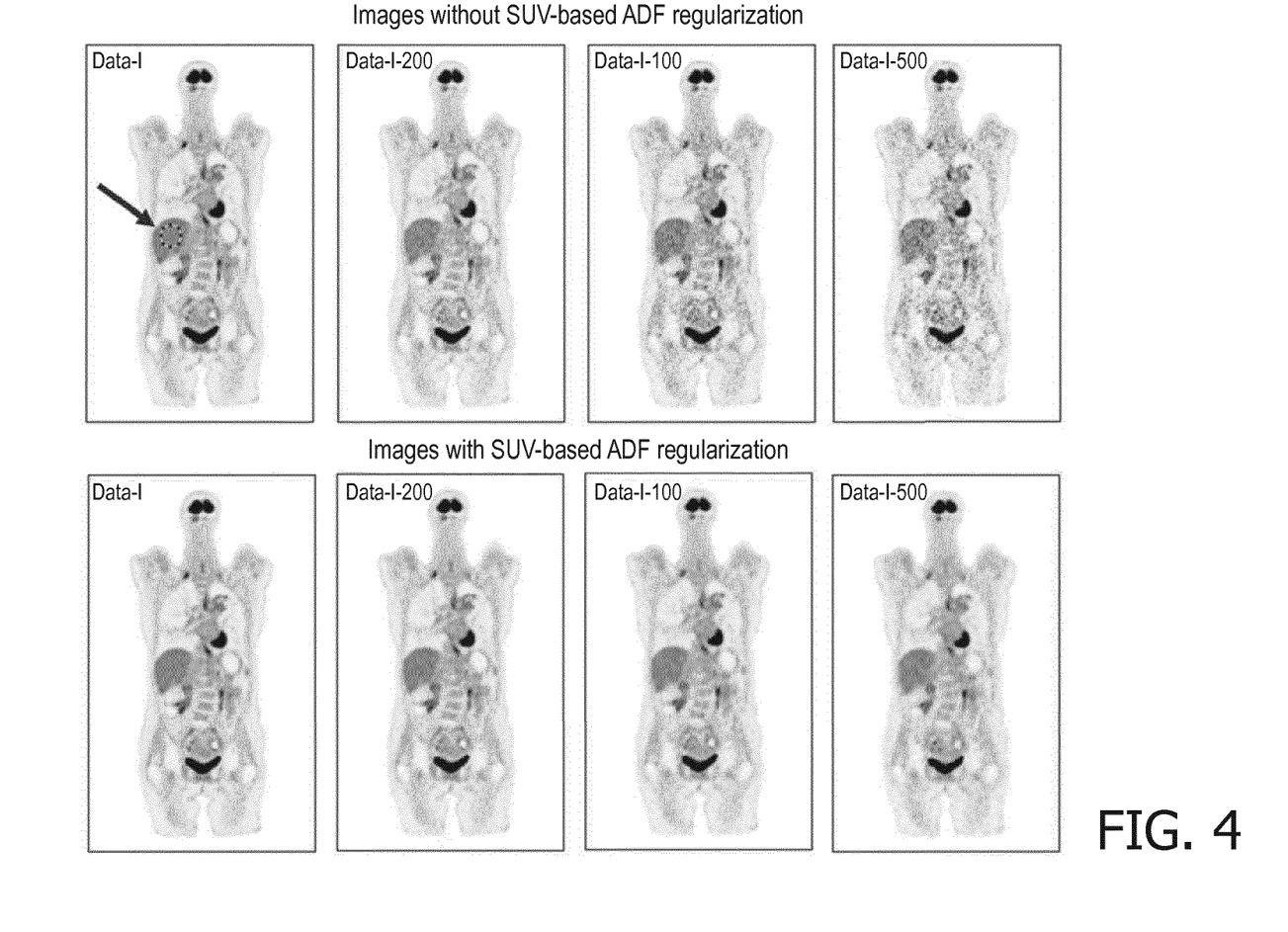
FIG. 4 presents PET images without an illustrative SUV-based anisotropic diffusion filtering (ADF) regularization (top row) and with the illustrative SUV-based ADF regularization (bottom row).

As a non-limiting illustrative example, the noise level estimate for a given SUV intensity level in the image can be modelled using the SUV scaling factor, which provides additional guidance for robust adaptive parameterization. In this way, the filter adapts its parameters based on the imaging environment and performs the filtering to suppress noise. Such a filter can be applied to the update image (n+1) 36 as the filter 48 shown in FIG. 1. Different edge preserving filtering cores can be used, e.g. an anisotropic diffusion filter (ADF) such as the Perona-Malik diffusion filter core as an example, suitably expressed as:

$$g(\nabla I, SUV, SUV_{scl}, \ldots) = \frac{1}{1 + \left(\frac{|\nabla I|}{K(SUV, SUV_{scl}, \ldots)}\right)^2} \quad (4)$$

where $\nabla I$ represents the local gradient factor and $K(SUV, SUV_{scl}, \ldots)$ represents an illustrative anisotropic weight formulation dependent upon SUV values. The local gradient factor K is analogous to the edge preservation threshold γ in other edge preserving filters or priors discussed herein. In this illustrative anisotropic weight formulation, SUV represents the SUV image intensity level and $SUV_{scl}$ represents the SUV scaling. It is to be appreciated that the Perona-Malik diffusion model of Equation (4) is only an illustrative example, and numerous other filter core models are contemplated, and more generally the filter may employ a different formulation besides a core model. Optionally, the regularization scheme can be implemented as an iterative process with adaptive step control built with additional prior information such as user noise reduction preference to achieve consistent regularization results. With continuing reference to FIG. 4, an illustrative example of improvement obtained using the illustrative Perona-Malik diffusion filter of Equation (4) is presented. For the illustrative example, an anisotropic diffusion filter (ADF) was employed as an illustrative example of filter 48:

$$I_i^{(t+1)} = I_i^{(t)} + \frac{\lambda(\alpha, \Phi_i) \cdot \Delta d}{|\Phi_i|} \sum_{j \in \Phi_i} g(\nabla \|I_{i,j}\|) \nabla I_{i,j} \quad (5)$$

$$\lambda(\alpha, \Phi_i) = \begin{cases} 1.0 & \bar{\mu}_{\Phi_i} \geq \alpha \\ \left(\frac{\bar{\mu}_{\Phi_i}}{\alpha}\right)^2 & \bar{\mu}_{\Phi_i} < \alpha \end{cases}$$

where g is given in Equation (4), $\Delta d$ is a step size parameter, $\Phi_i$ is a local window, $\mu_{\Phi_i}$ is the mean value of the local window, and α is a protection boundary parameter. Patient oncology images were used in the parameterization process. Whole body patient data sets were acquired using a Philips Vereos™ digital PET/CT imaging system, using a protocol for dose injection of about 13 mCi and scan duration of 90 seconds per bed position. The largely variant patient BMI and uptake time led to significantly different data statistics among the patient data sets, making a suitable test for the SUV-guided reconstruction control disclosed herein.

The following data sets were considered. One data set with relatively high statistics (400 million total counts) data (Data-I) was selected and reconstructed using a list-mode TOF OSEM reconstruction with 2 mm resolution with fixed reconstruction and post-reconstruction resolution recovery parameters currently in use for clinical imaging. Due to the high statistics of the data, the reconstructed image is at a noise level deemed clinically acceptable, such that no post-reconstruction denoising is employed. The Data-I set is used here as a standard reference image with desired noise level to set the goal of parametrization. Images reconstructed using the same reconstruction method and parameters from four other data sets with lower statistics than Data-I were used to determine the SUV-based parameterizations based on the targeted noise level of Data-I, as described next.

To simplify parameter tuning, parameters K, were set to be constant SUV based values in this illustrative example, Δd was also set to be a small constant value to ensure numerical stability. The iteration numbers that achieved the targeted noise level from the tuning sets was recorded. A non-linear regression was applied on the resulting set of iteration numbers to built a polynomial based scheme to automatically determine iteration number for other different images. Once the parameter set was determined, they were applied to images from other, low statistical data sets without further modification. Three low statistical data sets with 200, 100 and 50 million total counts (Data-I-200, Data-I-100 and Data-I-50, respectively) were generated by clipping the list-mode data of Data-I to the corresponding count level. The filter of Equation (5) was applied to the reconstructed images from these three data sets to directly compare with the reference image of Data-I. Denoising performance and stability of the parameter selection is evaluated by visual image inspection and region of interest (ROI) studies in terms of noise level and feature SUV preservation. Similarly studies were conducted on images from two other low-count patient data sets as well to confirm observation.

FIG. 4 presents PET images without the illustrative SUV-based ADF regularization of Equations (4)-(5) (top row) and with the illustrative SUV-based ADF regularization of Equations (4)-(5) (bottom row). All SUV based ADF images of the bottom row were generated using the same SUV-based parameters. Table 1 presents the SUV-based parameters obtained from the SUV parameterization, which were used to generate the images with SUV-based ADF regularization (FIG. 4, bottom row). Table 2 presents liver ROI quantitative measurements on the images without the SUV-based ADF regularization (top row of FIG. 4) while Table 3 presents liver ROI quantitative measurements on the images with the SUV-based ADF regularization (bottom row of FIG. 4). In Tables 2 and 3, "CNT" indicates the counts image, "SUV" indicates the SUV image, "mean" indicates the mean intensity over the liver region of interest (ROI), and "Std" indicates the standard deviation of the intensity over the liver ROI. The last column in Tables 2 and 3, listing the "Std/Mean", represents the noise/signal ratio ("N/S" indicated in Tables 2 and 3). The SUV-based ADF images (FIG. 4 bottom row) and corresponding quantitative measurements (Table 3) indicate that the SUV based parameterization generates consistent regularization performance over different data statistics. In particular, it can be seen that for the images with SUV-based ADF regularization (Table 3), the noise/signal ratio ("Std/Mean" final table column) is essentially constant (ranging from 0.08-0.09) over different image statistics. By contrast, the noise/signal ratio varies from 0.08-0.23 for the images without this regularization.

TABLE 1

SUV-based parameters obtained from SUV parameterization

| K | α | Δd |
|---|---|---|
| 0.5 | 2.5 | 0.07 |

TABLE 2

Liver ROI Measurements on Images Without SUV-based ADF regularization

| Data/ROI Measure | Mean (CNT) | Std (CNT) | Mean (SUV) | Std (SUV) | Std/Mean (N/S) |
|---|---|---|---|---|---|
| Data-I | 247.25 | 19.34 | 1.97 | 0.15 | 0.08 |
| Data-I-200 | 124.14 | 14.51 | 2.03 | 0.24 | 0.12 |
| Data-I-100 | 64.66 | 10.91 | 2.01 | 0.34 | 0.17 |
| Data-I-50 | 31.33 | 7.36 | 2.05 | 0.48 | 0.23 |

TABLE 3

Liver ROI Measurements on Images With SUV-based ADF regularization

| Data/ROI Measure | Mean (CNT) | Std (CNT) | Mean (SUV) | Std (SUV) | Std/Mean (N/S) |
|---|---|---|---|---|---|
| Data-I | 247.25 | 19.34 | 1.97 | 0.15 | 0.08 |
| Data-I-200 | 122.40 | 9.18 | 2.00 | 0.15 | 0.08 |
| Data-I-100 | 64.66 | 5.14 | 1.98 | 0.16 | 0.08 |
| Data-I-50 | 30.43 | 2.60 | 1.99 | 0.17 | 0.09 |

The use of the SUV image 42 to adjust one or more parameters of the image update 32 provides a consistent and stable level of image values that normalizes out extraneous factors such as patient weight, scan duration, injection dose, dose decay time, and so forth which generally vary from patient to patient and perhaps between imaging sessions for the same patient. Control of the iterative reconstruction using SUV is more robust than controlling image counts, since the SUV for a feature is relatively independent of the various extraneous patient- and imaging session-specific factors. Unlike counts, the SUV can be quite stable for major organs such as liver, lung, and body background.

In the disclosed approaches, the SUV transform 40 is applied during PET image reconstruction, e.g. during the MLEM or other iterative reconstruction update step 32 via prior or filter 38 one or more of whose parameters are tuned using update SUV image (n) 42; or, as a filter 48 applied to the resulting update image (n+1) 36 one or more of whose parameters are tuned using update SUV image (n+1) 46. (It is also contemplated to both apply the prior or filter 38 during the update step and to apply the filter 48 to the resulting update image (n+1) 36.) This repurposes the SUV transform 40, which is usually employed only to convert the final reconstructed image to a form more suitable for clinical analysis, to also provide for improved and more robust control of the iterative image reconstruction process. Advantageously, SUV values of organs such as the liver are typically stable in a certain range across different patient body mass index (BMI) values and PET imaging data acquisition parameters. By contrast, PET images having voxel values in counts or intensity have much greater variability amongst patients with different BMI, for different radiopharmaceutical doses, and so forth.

In general, iterative PET image reconstruction can be guided by prior knowledge, e.g. encapsulated as a prior used in regularization, or in an edge-preserving filter, or so forth, to provide improved noise control or other improvement in image quality during the iterative process. However, update images represented as counts or intensity provide no principled basis for setting the parameter(s) for such control, because the counts or intensity during PET reconstruction exhibit high patient-to-patient and imaging session-to-imaging session variation across different imaging cases, which limit the robustness of the control. The disclosed approach employing the update SUV image 42 for setting the control parameter(s) leverages the existing SUV transform 40 to provide more robust control of the iterative reconstruction.

In some illustrative embodiments of the disclosed SUV guided PET reconstruction and image processing control, the SUV update image 42 is generated for an intermediate update image 34 or to the update image 36, and information from the SUV update image 42 or 46 is extracted to guide the control of the continued iterative PET reconstruction or image processing. Each such SUV update image is analyzed quantitatively and compared to previous update images to assess noise propagation trending and contrast recovery trending of the reconstruction. Optionally, local control can be provided on a per-voxel basis, or regions of interest (ROIs) can be defined based on different SUV categories such as high SUV uniform regions, low SUV uniform regions, and high SUV features, which can be used to measure the reconstruction behavior for different SUV categories. The quantitative SUV update image analysis results are used to adjust the reconstruction parameters such as the illustrative edge preservation threshold γ of the illustrative RDP prior, and/or to adjust the number of subsets (e.g. in OSEM), the number of iterations (e.g. if the stopping criterion for the iterative reconstruction 30 is a fixed number of iterations), the smoothing parameters of a smoothing filter (e.g. applied as illustrative filter 48), a relative smoothing penalty strength for different regions (e.g., the RDP of the illustrative update step of Equation (3) applied as prior 38), or so forth, and the thusly controlled smoothing or contrast enhancement or other reconstruction control is applied during the current image update 32 or between successive iterative image updates. Reconstruction continues with the adjusted reconstruction parameters based on the original (or the processed) update image. The final reconstructed image output by the iterative image reconstruction 30 is optionally converted to an SUV image (i.e. the clinical image 44) using the same SUV transform 40 for quantitative clinical analysis by medical personnel.

Optionally, the SUV update images are stored in the RIS or PACS, and may be retrieved and reviewed by medical personnel to assist in clinical analysis. In general, the SUV update images at different iterations of the iterative image reconstruction 30 have different contrast-to-noise properties. If the contrast-to-noise of the final clinical image 44 is not acceptable to the clinician, it may be that one of the stored SUV update images generated during the iterative image reconstruction 30 may better satisfy the clinician.

In another option, the SUV update images generated over the course of the iterative image reconstruction 30 may be evaluated to observe the evolution of certain ROIs. For example, the sequence of SUV update images can be formatted into a movie or video to dynamically illustrate the quantification evolution during the iterative image reconstruction 30, which can assist in better understanding the noise propagation behavior of the reconstruction. With this better understanding, a more accurate and confident judgement can be made on the readings of different features in the final image 44 with different level of contrast and resolution.

Figure 2:
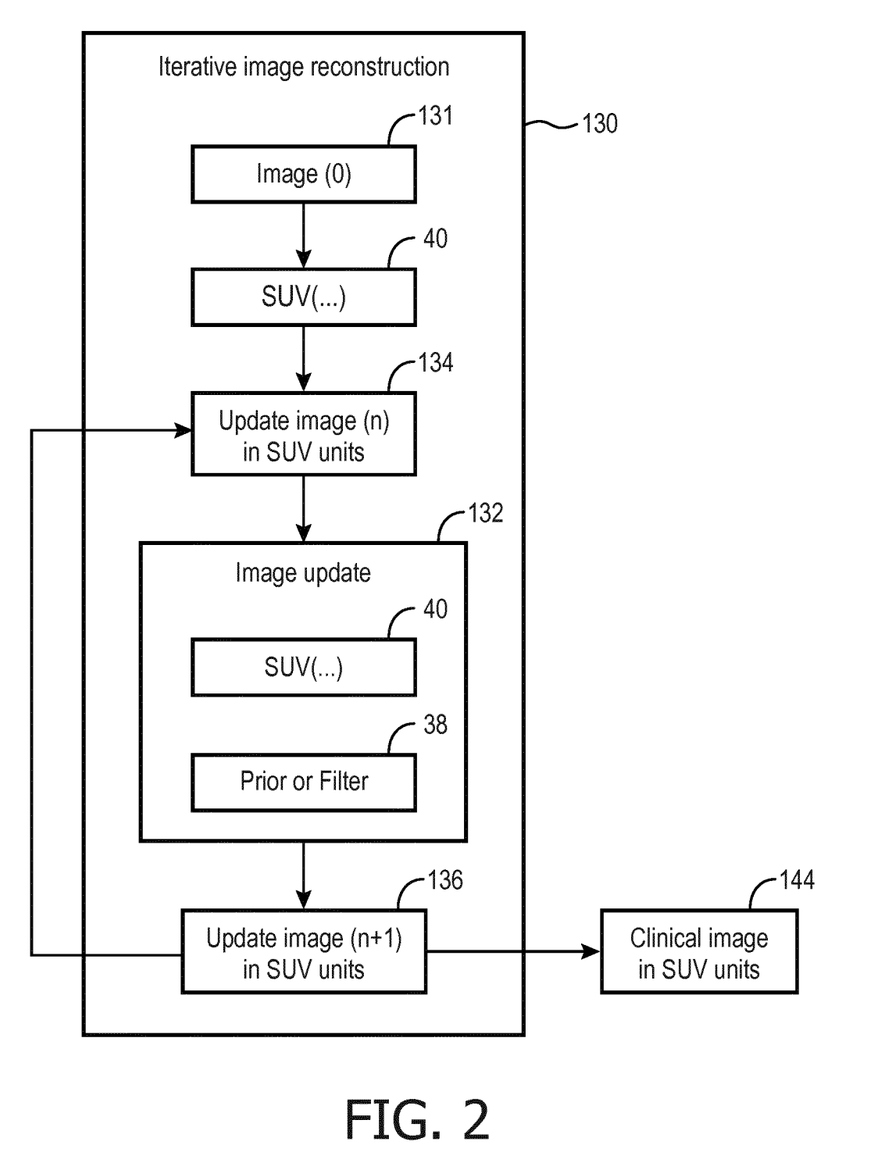
FIG. 2 diagrammatically illustrates an alternative embodiment of the iterative image reconstruction component of the PET imaging system of FIG. 1.

With reference to FIG. 2, a variant embodiment of the iterative image reconstruction 130 is described. In this embodiment, the SUV transform 40 is applied throughout the reconstruction process such that all images being processed are in SUV units. To this end, the initial image 131 (e.g. a uniform image for starting the iterative process, in some embodiments) is transformed using the SUV transform 40 to produce the first iteration of the update image (n) 134 in SUV units. In the image update 132, each image value is transformed using the SUV transform 40 into SUV units. For example, in Equation (1) the replacement $\lambda_j^{(n)} \leftarrow \text{SUV}(\lambda_j^{(n)})$ is applied throughout, which results in the next update image $\lambda_j^{(n+1)}$ in the sequence, that is, the update image (n+1) 136, being generated in SUV units. In this case, the regularization 38 (or in other embodiments, the filtering) can employ parameters adjusted based on the update image 134 which is already in SUV units. Moreover, since the iterative image reconstruction 130 operates on update images in SUV units, at termination it directly outputs the clinical image 144 in SUV units, eliminating the need to apply the final SUV transform as in conventional PET image reconstruction process flow.

In the embodiments of FIGS. 1 and 2, the SUV transform 40 is applied to provide more robust control during the iterative image reconstruction process 30, 130, e.g. as a prior or filter 38 integrated into the MLEM or other iterative reconstruction update step 32 and/or as a filter 48 applied to an update image 36. It is additionally or alternatively contemplated to employ control of post-reconstruction filtering of the image using the SUV-transformed image.

Figure 3:
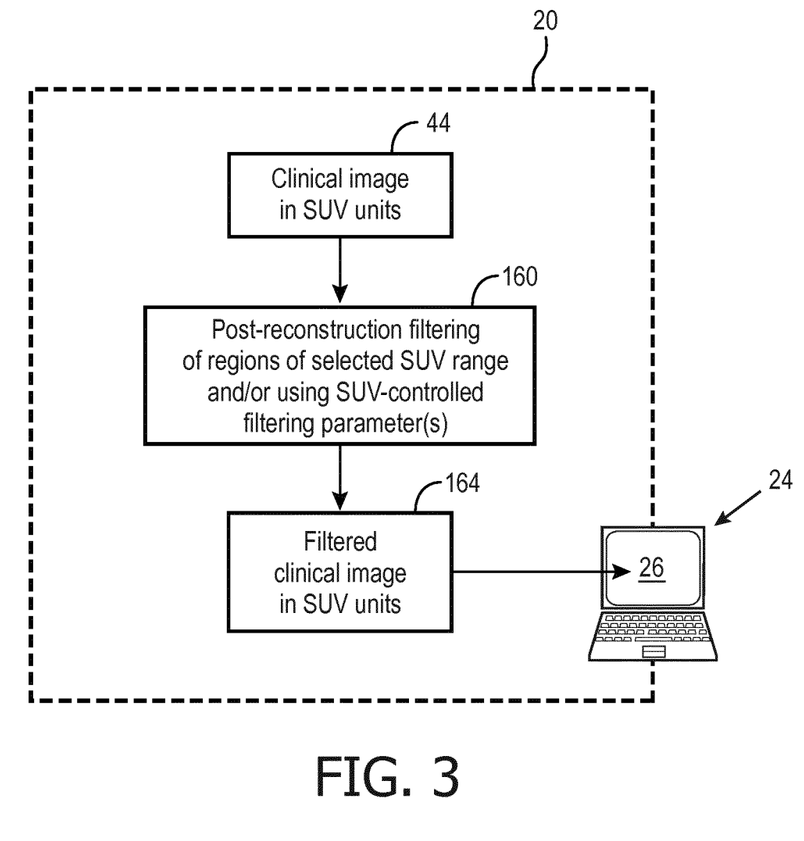
FIG. 3 diagrammatically illustrates a variant embodiment of the PET imaging system of FIG. 1 which employs SUV-mediated post-reconstruction image filtering.

With reference to FIG. 3, such a post-reconstruction approach starts with the clinical image 44 in SUV units. This image may be generated using the disclosed SUV-controlled image reconstruction processing of FIG. 1 or FIG. 2, or may be produced by conventional PET image reconstruction that does not leverage SUV for robustness. In an operation 160 performed by the electronic processor 20, post-reconstruction filtering is performed on regions of selected SUV range, and/or using SUV-controlled filtering parameter(s). For example, the filtering may only be applied in areas having SUV values in a range indicating they are background regions, thereby avoiding degradation by the filtering of image features. As another example, namely of using an SUV-controlled filtering parameter, the clinical image 164 may be generated by filtering the SUV image 44 using a filter 160 with an edge preservation threshold that is locally adjusted on the basis of local voxel values of the SUV image. The resulting filtered clinical image 164 is again in SUV units, and may be displayed on the display 26 operatively connected with the electronic processor 20 or otherwise utilized.

In the illustrative embodiments, positron emission tomography (PET) has been the nuclear medicine imaging modality. However, the SUV concept is also applicable to other nuclear medicine imaging modalities, such as single photon emission computed tomography (SPECT), and accordingly the disclosed SUV-controlled iterative image reconstruction and/or post-reconstruction filtering is also applicable to SPECT image reconstruction.

The invention has been described with reference to the preferred embodiments. Modifications and alterations may occur to others upon reading and understanding the preceding detailed description. It is intended that the invention be construed as including all such modifications and alterations insofar as they come within the scope of the appended claims or the equivalents thereof

The invention claimed is:

1. A nuclear medicine image reconstruction device comprising:
  an electronic processor; and
  a non-transitory storage medium storing instructions readable and executable by the electronic processor to perform an image reconstruction method including:

generating a reconstructed image by performing iterative image reconstruction on nuclear medicine imaging data wherein the iterative image reconstruction produces a sequence of update images; and during the iterative image reconstruction, applying a standardized uptake value (SUV) transform to convert an update image to an update SUV image and adjusting at least one parameter of the iterative image reconstruction using the update SUV image and performing at least one further iteration of the iterative image reconstruction using the adjusted at least one parameter;

wherein the SUV transform operates to scale values of voxels of the update image to SUV values using scaling factors including at least a body size metric and a dose metric.

2. The nuclear medicine image reconstruction device of claim 1 wherein the adjusting includes adjusting a parameter of a prior used in the iterative image reconstruction and the performing of at least one further iteration of the iterative image reconstruction uses the adjusted parameter of the prior.

3. The nuclear medicine image reconstruction device of claim 2 wherein the adjusting includes adjusting an edge preservation threshold of the prior used in the iterative image reconstruction and the performing of at least one further iteration of the iterative image reconstruction uses the adjusted edge preservation threshold.

4. The nuclear medicine image reconstruction device of claim 3 wherein the edge preservation threshold of the prior is adjusted locally based on local voxel values of the update SUV image.

5. The nuclear medicine image reconstruction device of claim 1 wherein the adjusting of at least one parameter of the iterative image reconstruction using the update SUV image comprises:

adjusting at least one parameter of a prior applied during an iterative image reconstruction update step of the iterative image reconstruction;

wherein the performing of at least one further iteration of the iterative image reconstruction includes applying the prior with the adjusted at least one parameter during the at least one further iteration.

6. The nuclear medicine image reconstruction device of claim 1 wherein the adjusting of at least one parameter of the iterative image reconstruction using the update SUV image comprises:

adjusting at least one parameter of a filter applied to an update image generated during the iterative image reconstruction;

wherein the performing of at least one further iteration of the iterative image reconstruction includes applying the filter with the adjusted at least one parameter during the at least one further iteration.

7. The nuclear medicine image reconstruction device of claim 1 wherein the scaling factors further include a dose decay computed for a dose decay time interval.

8. The nuclear medicine image reconstruction device of claim 1 wherein the update images are in count units, and the image reconstruction method further includes, after completion of the iterative image reconstruction:

converting the reconstructed image to a reconstructed SUV image using the SUV transform.

9. The nuclear medicine image reconstruction device of claim 1 wherein the SUV transform is applied to convert each update image whereby the iterative image reconstruction operates to generate the reconstructed image in SUV units.

10. A nuclear medicine imaging device comprising:

a nuclear medicine imaging data acquisition device configured to acquire nuclear medicine imaging data;

the nuclear medicine image reconstruction device of claim 9 operatively connected to generate a reconstructed image from the nuclear medicine imaging data acquired by the nuclear medicine imaging data acquisition device; and a display operatively connected with the electronic processor of the nuclear medicine image reconstruction device to display the reconstructed image.

11. The nuclear medicine imaging device of claim 10 wherein the nuclear medicine imaging data acquisition device comprises a positron emission tomography (PET) imaging gantry or scanner configured to acquire said nuclear medicine imaging data comprising PET imaging data.

12. A non-transitory storage medium storing instructions readable and executable by an electronic processor to perform an image reconstruction method comprising:

generating a reconstructed image by performing iterative image reconstruction on nuclear medicine imaging data wherein the iterative image reconstruction produces a sequence of update images;

during the iterative image reconstruction, applying a standardized uptake value (SUV) transform to convert an update image to an update SUV image wherein the SUV transform operates to scale values of voxels of the update image to SUV values using scaling factors including at least a body size metric and a dose metric; and during the iterative image reconstruction, adjusting at least one parameter used in an image update of the iterative image reconstruction using the update SUV image and performing at least one further iteration of the iterative image reconstruction using the adjusted at least one parameter.

13. The non-transitory storage medium of claim 12 wherein the adjusting comprises:

adjusting at least one parameter of a prior or filter applied during an iterative image reconstruction update step of the iterative image reconstruction using the update SUV image.

14. The non-transitory storage medium of claim 12 wherein the adjusting comprises:

adjusting at least one parameter of a filter applied to an update image generated during the iterative image reconstruction using the update SUV image.

15. The non-transitory storage medium of claim 14 wherein the adjusting includes adjusting an edge preservation threshold of the prior or filter.

16. The non-transitory storage medium of claim 12 wherein the scaling factors of the SUV transform further include a dose decay computed for a dose decay time interval.

17. The non-transitory storage medium of claim 16 wherein the prior or filter is a relative difference prior (RDP) incorporated into an iterative image reconstruction update step of the iterative image reconstruction.

18. The non-transitory storage medium of claim 12 wherein the adjusting includes locally adjusting a parameter of a prior or filter based on local voxel values of the update SUV image.

* * * * *